United States Patent [19]
Horowitz et al.

[11] Patent Number: 5,953,728
[45] Date of Patent: Sep. 14, 1999

[54] SYSTEM FOR MODIFYING A DATABASE USING A TRANSACTION LOG

[75] Inventors: Michael L. Horowitz; Michael J. McInerny; Stewart M. Clamen, all of Pittsburgh, Pa.

[73] Assignee: Claritech Corporation, Pittsburgh, Pa.

[21] Appl. No.: 08/900,441

[22] Filed: Jul. 25, 1997

[51] Int. Cl.$^6$ .................................................. G06F 17/30
[52] U.S. Cl. ........................... 707/202; 707/8; 707/10; 707/102
[58] Field of Search ................... 707/8, 10, 200, 707/204, 102, 202

[56] References Cited

U.S. PATENT DOCUMENTS

| | | | |
|---|---|---|---|
| 4,827,423 | 5/1989 | Beasley et al. | 364/468 |
| 5,278,982 | 1/1994 | Daniels et al. | 707/202 |
| 5,280,611 | 1/1994 | Mohan et al. | 707/8 |
| 5,455,946 | 10/1995 | Mohan et al. | 707/10 |
| 5,530,855 | 6/1996 | Satoh et al. | 707/201 |
| 5,799,305 | 8/1998 | Bortvedt et al. | 707/10 |
| 5,832,508 | 11/1998 | Sherman et al. | 707/200 |
| 5,832,515 | 11/1998 | Ledain et al. | 707/202 |

*Primary Examiner*—Wayne Amsbury
*Assistant Examiner*—Shahid Alam
*Attorney, Agent, or Firm*—Jones, Day, Reavis & Pogue; Blaney Harper

[57] ABSTRACT

The present invention is a computer system for modifying a database which comprises a computer that modifies records stored in a database. In the process for modifying records in the database, addresses to memory locations in a disk storage unit are accessed during the commit phase by first checking the address space in a transaction log. The computer system of the present invention operates by committing transactions without locking out readers. This is possible because any changed data in the database is reflected in the transaction log and the log must be accessed prior to reading from the disk storage unit. As a result, the user sees changed data when the log is accessed, or if data has not been changed, the log merely directs the computer to the address in the original database storage where unchanged data is stored.

6 Claims, 3 Drawing Sheets

SYSTEM FOR MODIFYING A DATABASE USING A TRANSACTION LOG

FIELD OF THE INVENTION

This invention relates generally to the field databases. In particular, this invention relates to techniques for changing records in a database while maintaining user access to the database.

BACKGROUND OF THE INVENTION

The volume of documents in databases is rapidly expanding. It has been estimated that in excess of 90% of all desired intelligence information is available in the records of accessible databases. In order for the information in databases to be useful, a user must be able to locate and modify records within a database. Operating on the records of a database typically involves a computer system that enables one or more users of the database to add, change, read, delete and/or otherwise manipulate records within the database. In order to allow this manipulation of the database records and maintain the integrity of the records in the database, the computer system must keep precise control over how and when users have access to the database.

The computer system that operates on the database generally comprises a central processing unit(CPU), main memory and disk storage. The CPU interacts directly with main memory and indirectly with disk storage through the main memory. The main memory is much faster at supplying information to the CPU than is the disk storage. However, the disk storage has much more capacity for storing information than main memory. Since the amount of information stored in databases is significantly larger than the capacity of the main memory, and since the data can be permanently stored in disk storage, the database records are maintained in disk storage.

Data is manipulated within the database through transactions. A transaction is a group of modifications to the database such that all of the modifications occur or none of them occur. That is, a transaction has the property of atomicity. A transaction basically consists of two phases. In a first phase, the transaction starts and the desired modifications to the database are assembled. During this first phase of the transaction, write operations other than the current transaction are not allowed on the database. In a second phase of the transaction, the modifications to the database are committed, i.e., the group of assembled modifications to the database are actually written to the records in disk storage. During the second or "commit" phase of a transaction, both read and write operations are not normally allowed. This is because, while changes to the database records are being made, the state of the database is not precisely known, and so read operations might receive inconsistent data.

Since the size of databases is large, the memory space required to merely assemble the group of modifications for a transaction is typically larger than the main memory of the computer. Also, once a transaction is in the commit phase, it must be completed (even if power to the computer is lost) or the state of the database will not be certain. As a result, when the modifications of a transaction are assembled in the first phase, they are written to a file in disk storage. In this way, if power is lost during the commit phase, no data will be lost and the commit process can be completed when power is returned.

In order to write the transaction modifications to disk storage, there must be space in disk storage for the file in which the changes are written. Generally, there are two options concerning where to write these changes. First, the modifications and their corresponding disk storage addresses could be written to a separate transaction log in disk storage during the first phase of the transaction. In this technique, each of the modifications are written to their corresponding disk storage addresses (over the old modified data) during the commit phase. Readers have direct access to the database during the first phase of this type of transaction because the original database records on disk storage remain unchanged until the commit phase. Once the modifications have been written to the database records in disk storage, the transaction log is discarded. In this type of transaction system the memory space taken up in disk storage is no more than necessary because only the modifications and their corresponding addresses are stored in the log. However, as noted above, readers do not have access to the database during the commit phase. This is a problem because the number of modifications to a database can be large, and as a result readers are locked out of the database for unacceptably long periods of time during the commit phase.

The second option for storing the transaction modifications on disk storage is to write them in the same files as the original database records during the first phase. As a practical matter, the memory size required for this technique is much larger than the memory size for a transaction log. Also, this technique requires the use of a de-reference table for all database access operations. The de-reference table (which is part of the transaction log) translates the addresses of the original database records to the addresses for the changed database records. Since the de-reference table must be used on all accesses to the database, the time required to access the database increases. As a result, neither of the conventional options for writing modifications to disk storage is satisfactory because one option locks out database users for long periods of time and the other requires reserving too much memory space in disk storage and causes access operations to be slower.

OBJECTS OF THE INVENTION

It is an object of the present invention to analyze documents in a database system.

It is still a further object of the present invention to modify documents in a database system while maintaining access to the database system.

It is still a further object of the present invention to modify documents in a database system while minimizing the memory space required for such modifications in the database storage unit.

SUMMARY OF THE PRESENT INVENTION

The present invention is a computer system for modifying a database which comprises a computer that modifies records stored in a database. In the process for modifying records in the database, addresses to memory locations in a disk storage unit are accessed during the commit phase by first checking the address space in a transaction log. The computer system of the present invention operates by committing transactions without locking out readers. This is possible because any changed data in the database is reflected in the transaction log and the log must be accessed prior to reading from the disk storage unit. As a result, the user sees changed data when the log is accessed, or if data has not been changed, the log merely directs the computer to the address in the original database storage where unchanged data is stored.

DETAILED DESCRIPTION OF THE INVENTION

Figure 1:
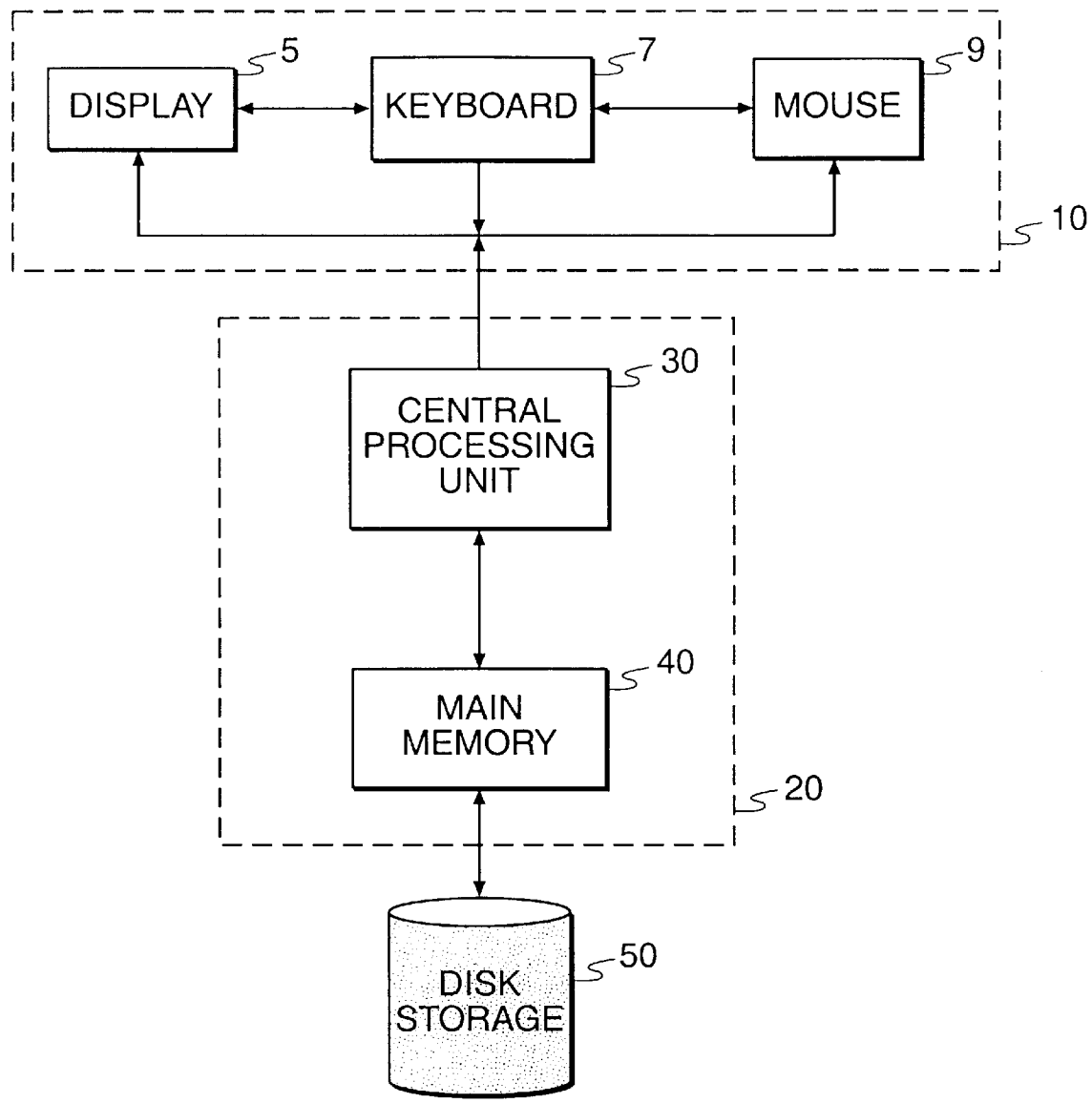
FIG. 1 is a block diagram of a computer system for retrieving and modifying data in database.

FIG. 1 is a block diagram of a computer system used for retrieving information from a database. Computer 20 comprises a central process unit (CPU) 30 and main memory 40. Computer 20 is connected to an Input/Output (I/O) system 10 and disk storage unit 50. The I/O system 10 includes a display 5, a keyboard 7 and mouse 9. In general, the disk storage unit 50 stores programs for operating the computer system and the documents associated with the database.

The computer 20 interacts with the disk storage unit 50 by retrieving and then executing a program stored in disk storage unit 50 that contains a series of instructions. These instructions cause computer 20 to retrieve and modify data stored in the database. This program works in conjunction with the I/O system to display data. This program also provides a user the ability to control the retrieval or modification process by operating the keyboard 7 or mouse 9. The computer 20 writes the modifications to the database in the disk storage unit 50.

In order to change the data in the database, the computer 20 must start a transaction process. As described above, a transaction is a two-phase process in which a series of modifications are made to the database in such a way that either all of the changes are made or none of them are made. Once a transaction process has begun, users who wish to make other write modifications to the database are disallowed, i.e., they are locked out of the database. During the first phase of a transaction, the modifications to be made to the database are written to a transaction log in the disk storage unit 50.

A transaction log is simply a file that stores a list of the new data that will replace the existing data in the databases. The transaction log must also store the addresses of where that new data is to be stored on the disk storage unit 50. The log must be placed on the disk storage unit 50 because the log is typically too large to be stored in the computer's main memory. Also, if the computer were to fail during the time when transactions are to be written to the database, the state of the database would not be lost. This is because the changes to the database are not stored in the computer's main memory 40 but rather in the relatively permanent disk storage unit 50.

During the first phase of the transaction process when the log is being formed, users of the database have read only access to the database. Users can directly read the database because the process of forming a log in disk storage does not affect any data in the database or any address at which the data is currently stored. Once the log has been formed, the commit phase of the transaction process begins.

The commit phase of the transaction process is the period during which the new data stored in the transaction log is copied into the address space for the old data that is currently in the database. During substantially all of the commit phase (except for a brief set-up period) readers are allowed to access the database. This is because when the commit phase is started, the process of reading the database changes. The read process changes from directly accessing the database addresses to an indirect address scheme. The indirect access scheme requires that all read operations initially reference a transaction log. When the transaction log is referenced a determination is made as to whether the reader is requesting data that has been modified during the current transaction. When the reader seeks data at an address that has been modified, the data in the transaction log is returned to the reader. When the reader seek data at an address that was not modified, the original data in the database at that read address is accessed. In effect, the transaction log is used as part of the database during the commit phase of the transaction. As a result, the reader always gets to access the latest changes to the database without having to wait until all the changes have been finally written into the database files in the disk storage unit 50. More importantly, since read access is allowed during the commit phase, users are not locked out of the database for substantial periods of time.

Figure 2:
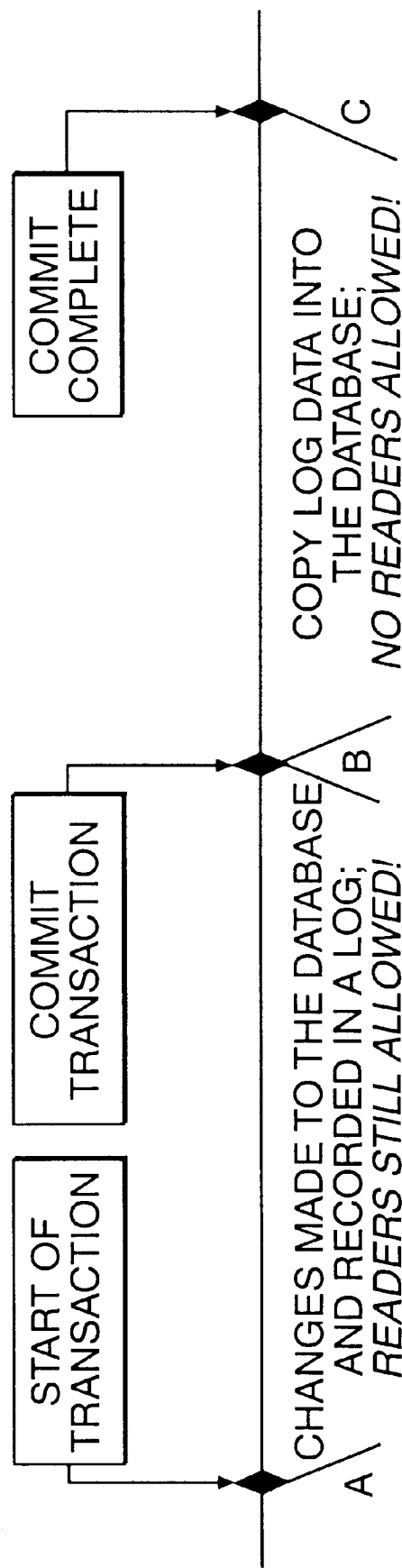
FIG. 2 is a diagram illustrating a prior art transaction sequence.
Figure 3:
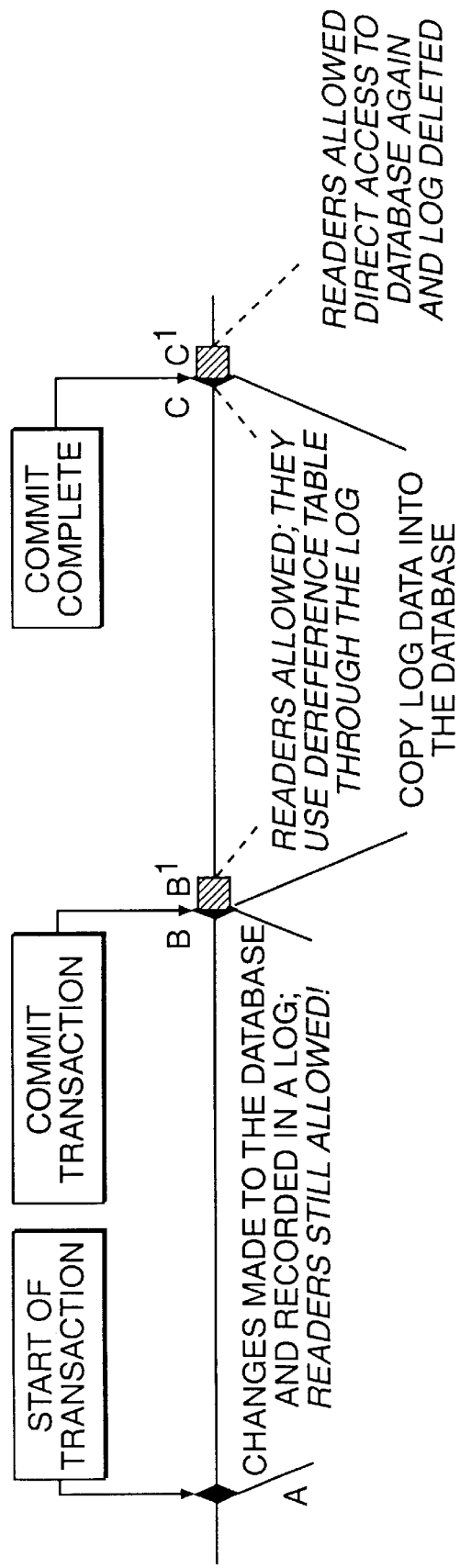
FIG. 3 is a block diagram illustrating the transaction sequence according to the present invention.

FIGS. 2 and 3 illustrate the differences in operation of the present invention from a conventional system. FIG. 2 illustrates the two-phase transaction process of a prior art system. The duration of the first phase is illustrated by the distance between points A and B. The commit phase is illustrated by the distance between points B and C. Once the commit phase is ended at C, a new transaction can take place. Readers are locked out from the database between points B and C. This time can range from minutes to hours or more depending on the number of modifications made to the database.

In contrast, FIG. 3 illustrates the process for the present invention. The first phase corresponds to the distance between points A and B. The commit phase starts at point B and ends at point C. Readers are given access (through the log) to the database from point B' to C. Readers are locked out from the database only during the time from B to B' which is a minimal time (generally less than a second) to flush internal caches. The time period for C to C' is used for the same purpose as the time period of B to B'. However, the commit process has ended at C and a new transaction can begin. Thus, in this transaction process read access to the database is available for the vast majority of time (ranging from minutes to hours) when modifications are being made to the data.

In this embodiment of the invention, when the commit process is complete at C, the transaction log is deleted. The transaction log is deleted because there is no need for the data in the log since the changes have been made in disk storage. As a result, there is only minimal use of storage to maintain the database at all times except during the commit phase. This is in contrast to conventional indirect addressing techniques that require additional memory to store the transaction log at all times, even after the commit phase is complete. Also, in this embodiment of the invention, since the de-reference table of the transaction log is available during the commit phase, readers have access to the database during the commit phase. This is in contrast to conventional systems in which readers are locked out of the database during the commit phase.

The reason that the computer system can use the de-reference table of the transaction log prior to looking for an address in disk storage during the commit phase is because of the address structure of the computer system. This address structure keeps backing store information with each file that informs a reader of the file what the characteristics of the file are. The type of backing store information kept with the file depends on the file but typically includes such file specific characteristics as the byte order for integers. One particular piece of backing store information kept with the file is whether or not a transaction is currently being performed on the file when a reader attempts to read the file or a writer attempts to modify a file. Since the backing store information can always indicate that the files for the database are being operated on by the transaction log, the backing store information is used to tell readers of the database files during the commit phase to first check the transaction log and determine what data is to be read.

While this invention has been particularly described and illustrated with reference to particular embodiments thereof, it will be understood by those skilled in the art that changes in the above description or illustrations may be made with respect to form or detail without departing from the spirit or scope of the invention.

We claim:

1. A computer system for modifying information in a database, comprising:

a computer coupled to a disk storage unit, said disk storage unit storing a database in at least one file;

wherein said computer modifies data in said database by writing a plurality of changes into a transaction log in said disk storage unit during a first time period;

wherein said computer writes data from said transaction log to said files storing said database during a second time period wherein said second time period does not overlap said first time period; and wherein said computer reads data corresponding to said modifications in said database from said transaction log during said second time period.

2. A computer system for modifying information in a database, as in claim 1, wherein:

said transaction log is deleted after said second time period.

3. A computer system for modifying information in a database, as in claim 1, wherein:

said computer detects when a transaction is being performed on said database and said computer stores information that indicates said detection in said database file.

4. A method for modifying information in a database, comprising:

instructing a computer to create a plurality of modifications to a database stored in at least one file on a disk storage unit;

instructing a computer to write a plurality of said modifications into a transaction log file on said disk storage unit during a first time period;

instructing said computer to write data from said transaction log to said files storing said database during a second time period wherein said second time period does not overlap said first time period; and instructing said computer to read data corresponding to said modifications in said database from said transaction log during said second time period.

5. A method for modifying information in a database, as in claim 4, further comprising:

instructing said computer to delete said transaction log after said second time period.

6. A method for modifying information in a database, as in claim 4, further comprising:

instructing said computer to detect when a transaction is being performed on said database and instructing said computer to store information that indicates said detection in said database file.

* * * * *